(12) United States Patent
Bali et al.

(10) Patent No.: US 7,793,335 B2
(45) Date of Patent: Sep. 7, 2010

(54) COMPUTER-IMPLEMENTED METHOD, SYSTEM, AND PROGRAM PRODUCT FOR MANAGING LOG-IN STRIKES

(75) Inventors: Bahri B. Bali, Apex, NC (US); Christopher E. Barnabo, Bethel, CT (US); Gordan G. Greenlee, Endicott, NY (US); Kan Y. Hsiao, Edison, NJ (US); Howard E. Poole, Poughkeepsie, NY (US); Richard E. Weingarten, Erie, CO (US)

(73) Assignee: International Business Machines Corporation, Armonk, NY (US)

( * ) Notice: Subject to any disclaimer, the term of this patent is extended or adjusted under 35 U.S.C. 154(b) by 1044 days.

(21) Appl. No.: 11/224,373

(22) Filed: Sep. 12, 2005

(65) Prior Publication Data
US 2007/0061864 A1    Mar. 15, 2007

(51) Int. Cl.
*G06F 21/00* (2006.01)
(52) U.S. Cl. .............................. 726/2; 726/21; 380/277
(58) Field of Classification Search ..................... 726/2, 726/21; 380/277
See application file for complete search history.

(56) References Cited

U.S. PATENT DOCUMENTS 6,182,142 B1 * 1/2001 Win et al. ................... 709/229
2002/0067832 A1 * 6/2002 Jablon ......................... 380/277
2003/0101359 A1 * 5/2003 Aschen et al. ............... 713/201
2003/0149900 A1 * 8/2003 Glassman et al. ........... 713/202
2006/0037064 A1 * 2/2006 Jeffries et al. .................. 726/4
2008/0120703 A1 * 5/2008 Morris et al. ................... 726/4
2008/0282091 A1 * 11/2008 Ashok et al. ................ 713/183

OTHER PUBLICATIONS

Microsoft, "Account Lockout Best Practices White Paper", May 20, 2004.*
Myers, Mike. MCSE/MSCA Windows Server 2003 Active Directory Certification Passport, 2003, Corel Ventura Publisher, 27; 3 Pages.*

* cited by examiner

*Primary Examiner*—Nasser Moazzami
*Assistant Examiner*—Lisa Lewis
(74) *Attorney, Agent, or Firm*—William Schiesser; Hoffman Warnick LLC (57) ABSTRACT

The present invention provides a computer-implemented method, system, and program product for managing log-in strikes in a geographically distributed computer infrastructure. Specifically, under the present invention, when a strike message is received on a strikeout server pursuant to an incorrect password input during an attempted log-in of a user, the incorrect password is compared to a strike list to determine if it was previously received on the strikeout server during a predetermined period of time. Based on this determination, the incorrect password and will be stored in a list on the strikeout server with a corresponding timestamp. Thereafter, the strike message and the timestamp will be replicated to all other strikeout servers in the infrastructure.

22 Claims, 5 Drawing Sheets

COMPUTER-IMPLEMENTED METHOD, SYSTEM, AND PROGRAM PRODUCT FOR MANAGING LOG-IN STRIKES

FIELD OF THE INVENTION

The present invention generally relates to log-in strike management. Specifically, the present invention provides a computer-implemented method, system, and program product for managing log-in strikes for a geographically distributed computer infrastructure.

BACKGROUND OF THE INVENTION

As computer infrastructures continue to grow in popularity and capability, an increasing number of resources are being provided in an on-line or computer environment. For example, it is common for organizations to provide a company or corporate network that employees access to perform their job functions and/or communicate with one another. Access to the network will typically occur through well known log-in techniques such as validation and authentication of a user/distinguished name and password. Similar techniques are practiced throughout the World Wide Web by website operators, network operators (e.g., America Online), etc.

Unfortunately, the convenience provided by such technology is often offset by security risks. For example, it has become increasingly common for malicious attackers to attempt to infiltrate a user's account. If such attempts are successful, any number of problems could arise. For example, the underlying network could be attacked, the user could be impersonated, etc. In addition, if and when the malicious attacker gains access, any information learned could be posted on any number of password trading Web sites. Many of these Web sites are very popular and may result in many other unauthorized individuals gaining access to protected systems.

Heretofore, many techniques have been suggested for controlling unauthorized access. Once such technique is disclosed in U.S. Patent Application Publication No. 20030101359 ('359), hereby incorporated by reference. In '359, a quantity of failed log-in attempts for a user are tracked. If the quantity of failed log-in attempts exceeds an allowable amount, the password for the user name being attempted is revoked. Specifically, under '359, when a failed log-in attempt is recognized, a message is sent to a strikeout server. The strikeout server will then determine the current quantity of failed log-in attempts and revoke the password if the current quantity exceeds the allowable amount. However, no existing system addresses the issues raised by a geographically distributed computer infrastructure that contains more than one strikeout server.

In view of the foregoing, there exists a need in the art to overcome the deficiencies indicated above.

SUMMARY OF THE INVENTION

In general, the present invention provides a computer-implemented method, system, and program product for managing log-in strikes for a geographically distributed computer infrastructure. Specifically, under the present invention, when an incorrect password is input pursuant to an attempted log-in, a strike message is communicated to a corresponding strikeout server (e.g., from a Lightweight Directory Access Protocol (LDAP) server). Under the present invention, the strikeout server is part of a group of strikeout servers of which one is designated as the master strikeout server. In addition, the strike message typically includes a distinguished name, an IP address for the computer location from where the failed log-in was attempted, and the incorrect password. Upon receipt, the strikeout server will determine whether the incorrect password was previously received within a predetermined period of time. If not, a new entry in a strike list corresponding to the distinguished name will be created in which the incorrect password will be stored with a corresponding timestamp. If, however, the incorrect password had been previously received within the predetermined time period, an entry would already exist in the list. In such a case, the previous timestamp in the existing entry will be replaced with the most recent timestamp. In either event, the strike message will be replicated to the other strikeout servers in the group for storage in their corresponding lists.

When a predetermined quantity of uniquely incorrect passwords is reached for a particular distinguished name within the predetermined period of time, a strikeout is registered. At such a point in time, a strikeout message is generated and replicated among all strikeout servers. Among other things, the strikeout out message causes the strikeout servers to clear their lists for that distinguished name.

A first aspect of the present invention provides a computer-implemented method for managing log-in strikes, comprising: receiving a strike message on a strikeout server pursuant to an incorrect password input during an attempted log-in of a user; comparing the incorrect password to a list to determine if the incorrect password was previously received on the strikeout server during a predetermined period of time; storing the incorrect password in the list on the strikeout server with a corresponding timestamp; and replicating the strike message and the timestamp to at least one other strikeout server.

A second aspect of the present invention provides a system for managing log-in strikes, comprising: a message reception system for receiving a strike message on a strikeout server pursuant to an incorrect password input during an attempted log-in of a user; a list comparison system for comparing the incorrect password to a list maintained on the strikeout server to determine if the incorrect password was previously received in another strike message during a predetermined period of time; a list storage system for storing the incorrect password in the list with a corresponding timestamp; and a message replication system for replicating the strike message and the corresponding timestamp to at least one other strikeout server.

A third aspect of the present invention provides a program product stored on a computer useable medium for managing log-in strikes, the program product comprising program code for causing a computer system to perform the following steps: receiving a strike message on a strikeout server pursuant to an incorrect password input during an attempted log-in of a user; comparing the incorrect password to a list maintained on the strikeout server to determine if the incorrect password was previously received in another strike message during a predetermined period of time; storing the incorrect password in the list with a corresponding timestamp; and replicating the strike message and the corresponding timestamp to at least one other strikeout server.

A fourth aspect of the present invention provides a method for deploying an application for managing log-in strikes, comprising: providing a computer infrastructure being operable to: receive a strike message on a strikeout server pursuant to an incorrect password input during an attempted log-in of a user; compare the incorrect password to a list maintained on the strikeout server to determine if the incorrect password was previously received in another strike message during a predetermined period of time; store the strike message in the list with a corresponding timestamp; and replicate the strike message and the corresponding timestamp to at least one other strikeout server.

A fifth aspect of the present invention provides computer software embodied in a propagated signal for managing log-in strikes, the computer software comprising instructions for causing a computer system to perform the following: receive a strike message on a strikeout server pursuant to an incorrect password input during an attempted log-in of a user; compare the incorrect password to a list maintained on the strikeout server to determine if the incorrect password was previously received in another strike message during a predetermined period of time; store the strike message in the list with a corresponding timestamp; and replicate the strike message and the corresponding timestamp to at least one other strikeout server.

Therefore, the present invention provides a computer-implemented method, system, and program product for managing log-in strikes for a geographically distributed computer infrastructure.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

For convenience purposes, the Best Mode for Carrying Out the Invention will have the following sub-sections:

I. General Description
II. Illustrative Embodiment
III. Computerized Implementation I. General Description As indicated above, the present invention provides a computer-implemented method, system, and program product for managing log-in strikes for a geographically distributed computer infrastructure. Specifically, under the present invention, when an incorrect password is input pursuant to an attempted log-in, a strike message is communicated to a corresponding strikeout server (e.g., from a LDAP server). Under the present invention, the strikeout server is part of a group of strikeout servers of which one is designated as the master strikeout server. In addition, the strike message typically includes a distinguished name, an IP address for the computer location from where the failed log-in was attempted, and the incorrect password. Upon receipt, the strikeout server will determine whether the incorrect password was previously received within a predetermined period of time. If not, a new entry in a strike list corresponding to the distinguished name will be created in which the incorrect password will be stored with a corresponding timestamp. If, however, the incorrect password had been previously received within the predetermined time period, an entry would already exist in the list. In such a case, the previous timestamp in the existing entry will be replaced with the most recent timestamp. In either event, the strike message will be replicated to the other strikeout servers in the group for storage in their corresponding lists.

When a predetermined quantity of uniquely incorrect passwords is reached for a particular distinguished name within the predetermined period of time, a strikeout is registered. At such a point in time, a strikeout message is generated and replicated among all strikeout servers. Among other things, the strikeout out message causes the strikeout servers to clear their lists for that distinguished name.

II. Illustrative Embodiment

Figure 1:
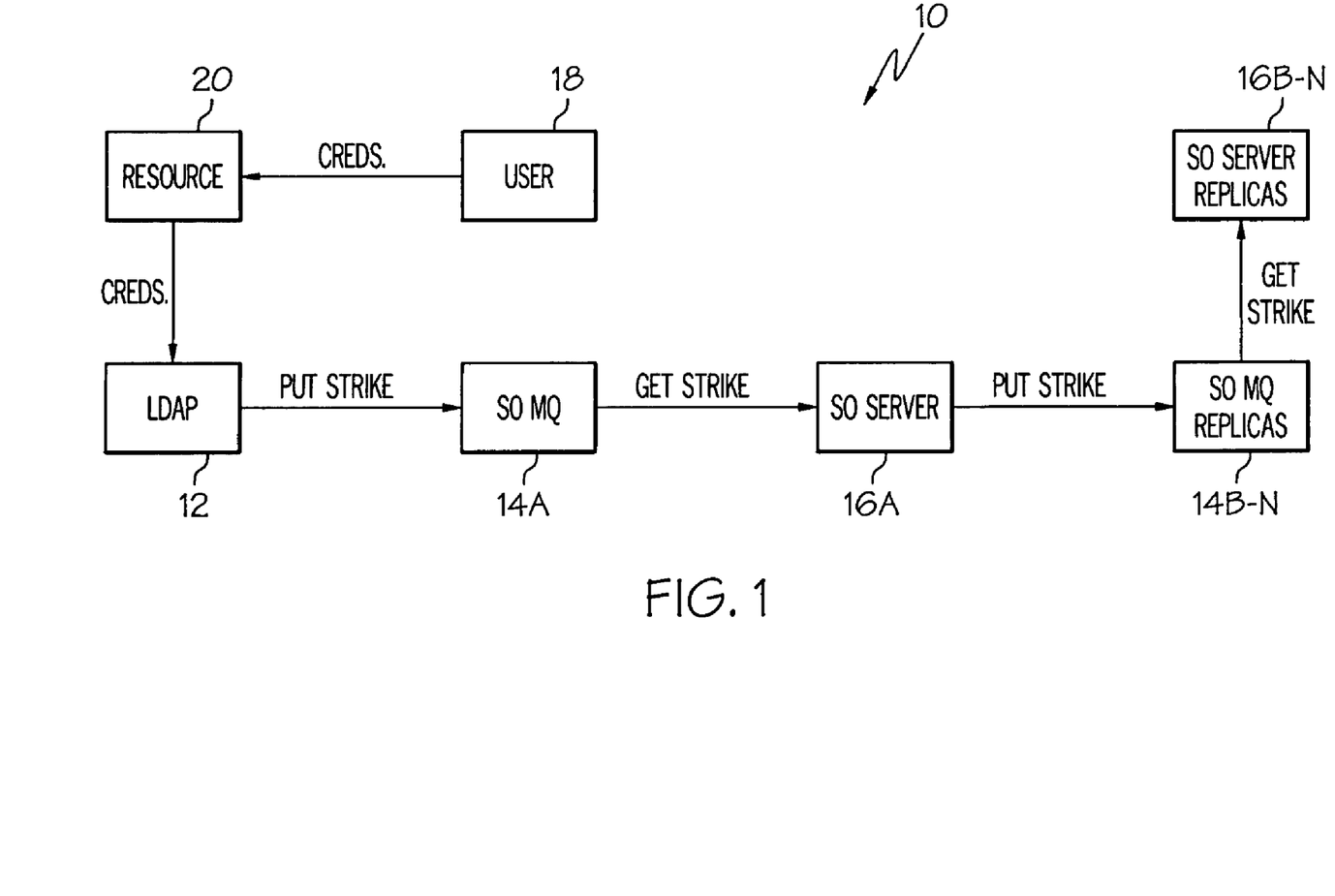
FIG. 1 depicts an illustrative log-in strike flow according to the present invention.

Referring now to FIG. 1 an illustrative replication flow 10 between strikeout servers 16A and 16B-N is shown. In this illustrative embodiment, assume that a user 18 is attempting to log into a computer application, computer network, or some other computer-based resource 20. Further assume that in making such an attempt, user 18 inputs invalid credentials in the form of an incorrect password. When the invalid credentials are sent to the LDAP server 12, a strikeout plug-in (not shown) in LDAP server 12 writes the distinguished name (DN) for user 18 and the incorrect password to a file that is then collected by another program (e.g., a Java program). This other program will put the distinguished name and incorrect password in a strikeout message queue (SO MQ) 14A. This "element" that now exists on the SO MQ 14A is referred to herein as a strike message that includes the distinguished name, the incorrect password, and an Internet Protocol (IP) address corresponding to a physical computer location from which the log-in was attempted (e.g., the IP address of the computer that user 18 is operating to make the log-in attempt). As will be further illustrated below, the IP address is typically only used for logging purposes, while the DN and incorrect password are used to determine whether or not to strike user 18 out.

In any event, any strikes that are collected on SO MQ 14A will be communicated to a corresponding/associated strikeout server 16A. In general, strikeout server 16A can receive strikes from two sources: LDAP server 12 (via SO MQ 14A as illustrated in FIG. 1) or another strikeout server 16B-N (as will be illustrated in FIG. 2). When a strikeout server 16A receives a strike message from LDAP server 12, strikeout server 16A will put the strike message on all other SO MQs 14B-N for replication to all other strikeout servers 16B-N. Conversely, if the strike message originates from another strikeout server (e.g., strikeout server 14B), the strike message will not be further replicated.

In both instances, the strike message is processed into a strike list. That is, when strikeout server 16A receives a strike message, it adds/stores the strike message or pieces thereof to a strike list corresponding to the DN. In a typical embodiment, the incorrect password is stored in the strike list with a timestamp corresponding to the time/date of the failed log-in attempt. This timestamp is propagated to all other strikeout servers 16B-N as part of the replication process. The timestamp is typically stored as a UTC to ensure that each timestamp in each geography is the same regardless of time zones. Each strike message can also be tagged with certain identifiers:

ldap—indicating that the strike message came from the LDAP server;

repl—indicating that the strike message came from a replica strikeout server;

repl5—indicating that the strike message came from a replica strikeout server, and the replica is sending a strikeout request; and clear—indicating that a strike list for a particular DN should be cleared.

In storing the strike information, a comparison of the incorrect password to the strike list is performed to determine whether the incorrect password was previously received for that DN within a predetermined period of time. If not, a new entry in the strike list will be created in which the incorrect password and the timestamp are stored. If, however, the incorrect password had been previously received within the predetermined time period, an entry would already exist in the list. In such a case, the previous timestamp in the existing entry will be replaced with the most recent timestamp.

Figure 2:
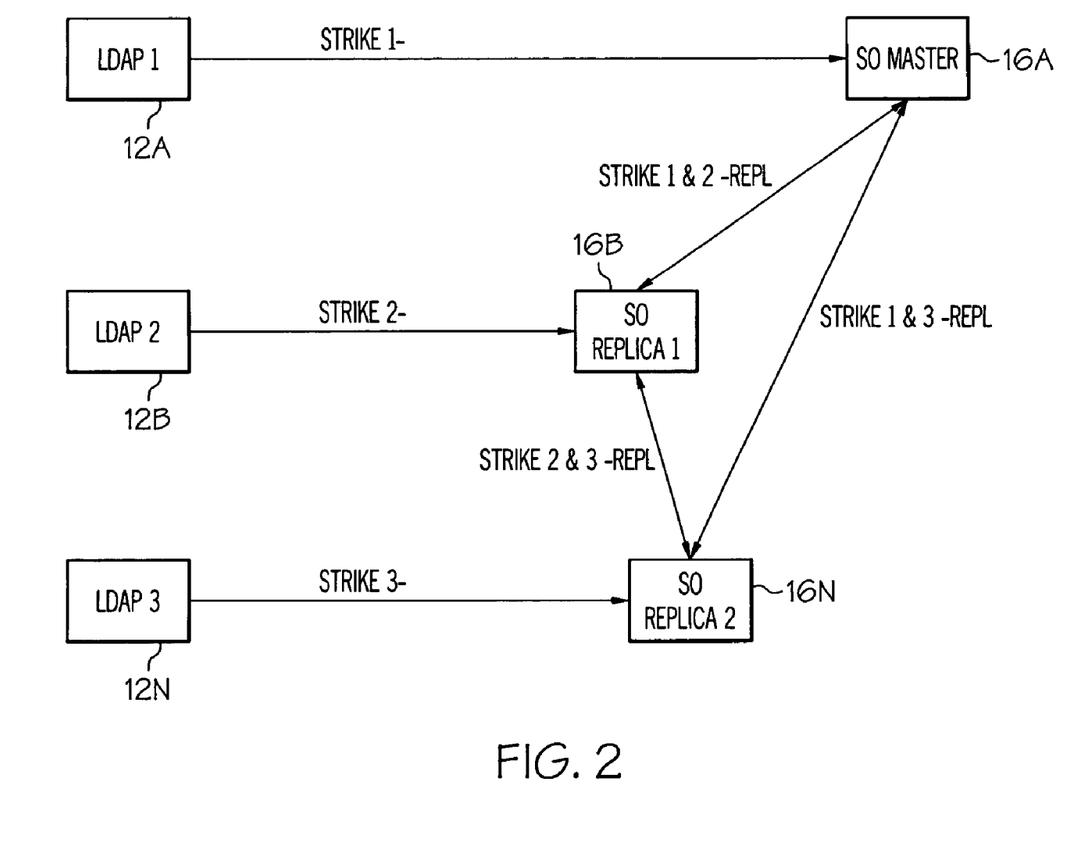
FIG. 2 depicts a strike replication flow between strikeout servers according to the present invention.

Referring now to FIG. 2, the replication flow between a group of strikeout servers 16A-N is shown. As shown, one strikeout server 16A is designated as a master strikeout server, while the other strikeout servers 16B-N are designated as replica strikeout servers. It should be understood that although strikeout server 16A is designated as the master, this need not be the case. Rather, any strikeout server 16A-N could serve as the master strikeout server. As further shown, each strikeout server 16A-N is in communication with a corresponding LDAP server 12A-N. Under the present invention, each strikeout server 16A-N can receive strike messages from its corresponding LDAP server 12A-N (e.g., via intervening SO MQs that are shown in FIG. 1) or another strikeout server 16A-N. When a strike message is received by any strikeout server 16A-N, that strike message will be replicated to the other strikeout servers, as illustrated in FIG. 2. A strikeout server 16B-N receiving a replicated strike message will then perform the list comparison and storage steps discussed above.

Figure 3:
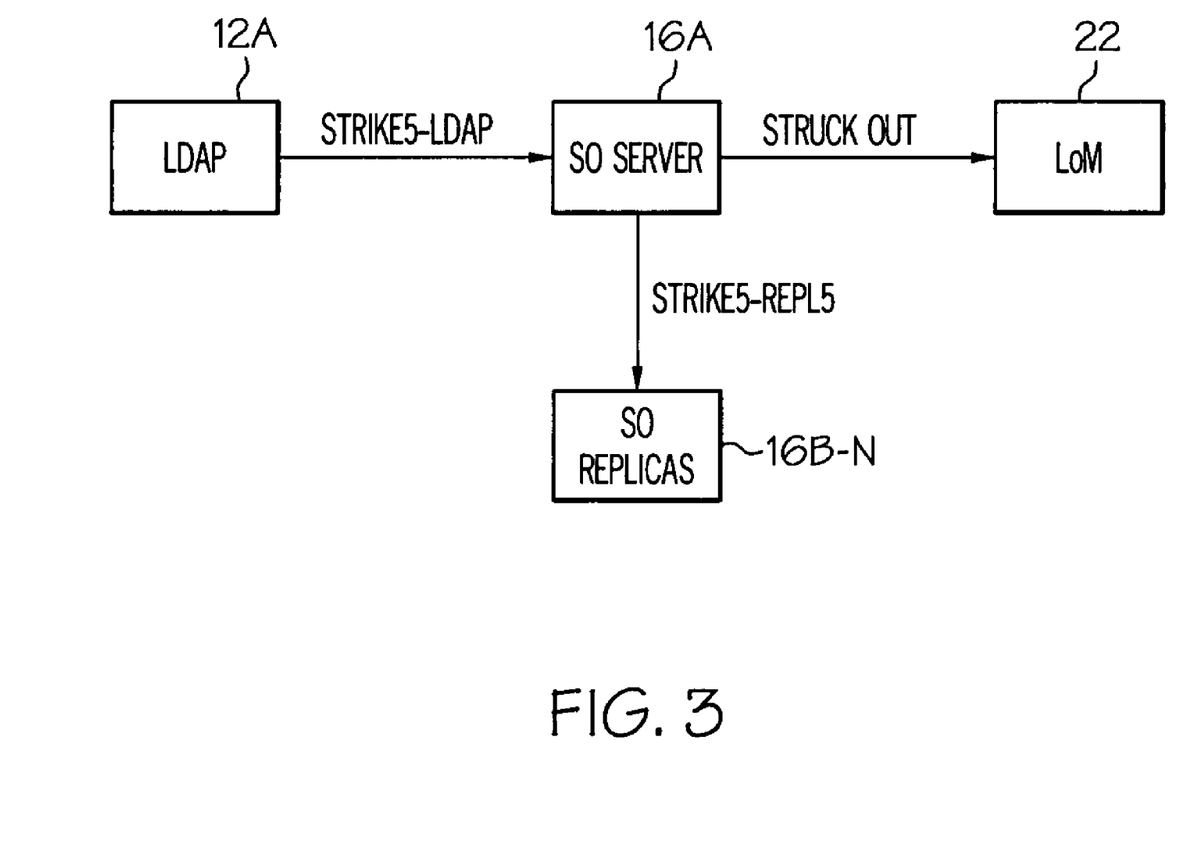
FIG. 3 depicts a strikeout replication flow between a master strikeout server and other strikeout servers according to the present invention.

When a predetermined quantity (e.g., 5) of uniquely incorrect passwords are accumulated with a predetermined period of time (e.g., 24 hours), a strikeout is realized. Under the present invention, the incorrect passwords should be unique from one another. Thus, if the same incorrect password is received multiple times for a certain DN, only one strike is registered. Referring to FIG. 3, the strikeout procedure according to a typical embodiment of the present invention is shown. In general, if the strikeout servers 16A-N are in sync, a master strikeout server 16A will only receive a strikeout message from an LDAP server 12A. Conversely, as will be further shown below in conjunction with FIG. 4, if master strikeout server 16A receives a strikeout message from another strikeout server 16B-N, it is an indication that the strikeout servers 16A-N are out of sync.

In any event, as shown in FIG. 3, when the predetermined quantity of strikes are accumulated within the predetermined period of time, and the last strike message was received from LDAP server 12A (instead of another strikeout server 16B-N), then a strikeout message is sent to a LDAP over MQ Series (LoM) server 22, and the strike list for the corresponding DN is cleared. The strikeout message is also tagged as "repl5" and replicated to the other strikeout servers 16B-N.

Shown below is an illustrative Lightweight Directory Interchange Format (LDIF) command sequence used to strike a user out:

dn: uid=11111897,c=us,ou=bluepages,o=ibm.com
changetype: modify
delete: userpassword
-
replace: historicpassword1
historicpassword1: SHA encoded pw
-
replace: historicpassword2
historicpassword2: SHA encoded pw
-
replace: historicpassword3
historicpassword3: SHA encoded pw
-
replace: historicpassword4
historicpassword4: SHA encoded pw
-
replace: historicpassword5
historicpassword5: SHA encoded pw
-
replace: passwordmodifytimestamp
passwordmodifytimestamp: 20050112

Figure 4:
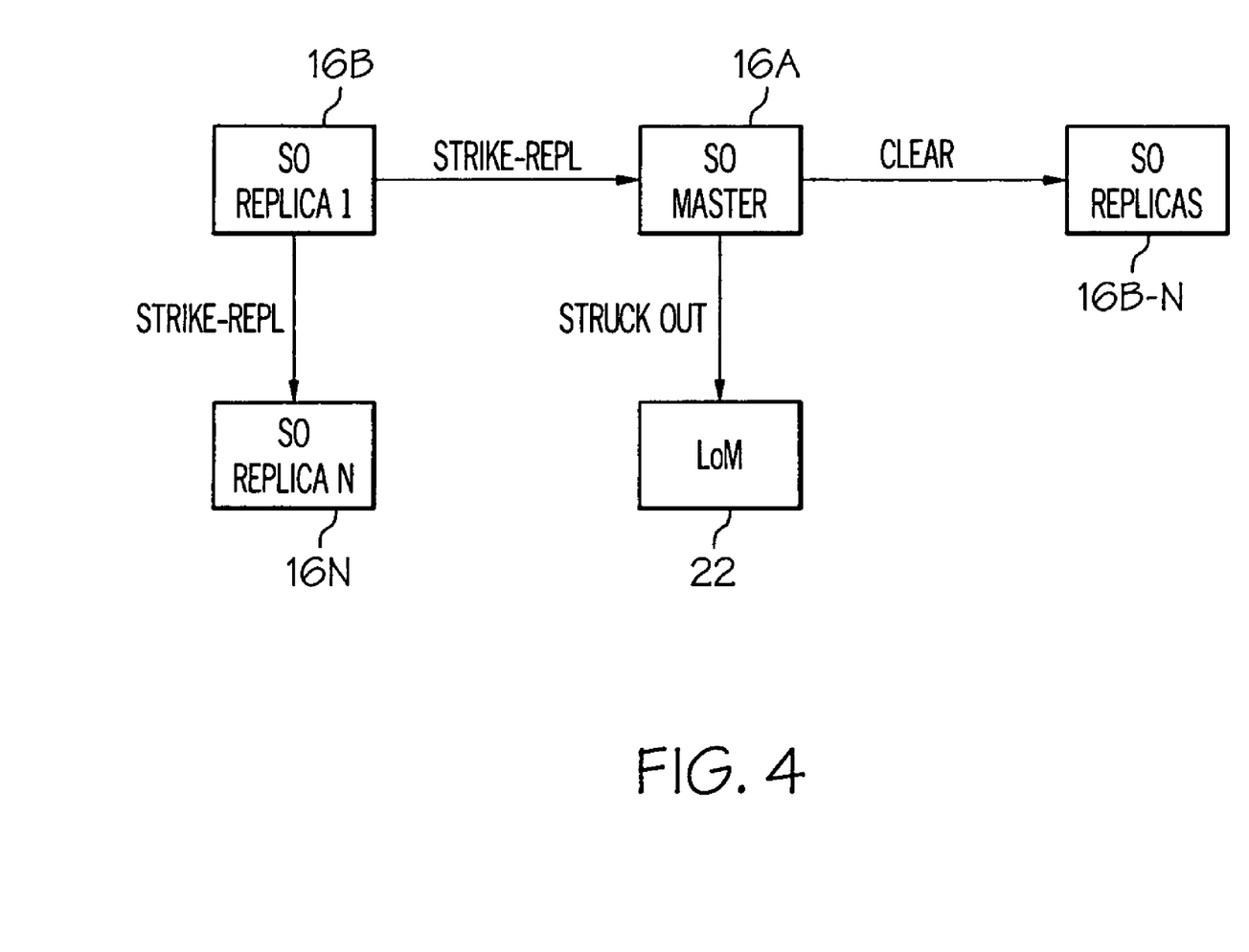
FIG. 4 depicts a list clearing flow to provide synchronization of strikeout servers according to the present invention.

Referring to FIG. 4, the difference between a master strikeout server 16A receiving a strikeout message from an LDAP server and another "replica" strikeout server 16B-N will be described. Specifically, if a strikeout server 16A-N receives a message tagged with "repl", it means that message was received from another strikeout server. In such an instance, the message would be processed it as usual. That is, if the strike list has reached the predetermined quantity of strikes (incorrect passwords), then the strike list would be cleared, but a strikeout message would not be sent. If the master strikeout server 16A reaches the predetermined quantity of strikes with a message tagged with "repl", this means that that the servers are out of sync. As a result, master strikeout server 16A will send a strikeout message to all replica strikeout servers 16B-N and LoM server 22, as well as a "clear" message to all replica strikeout servers 16B-N. The "clear" message tells all of the replica strikeout servers 16B-N to clear their strike lists for the particular DN, thus synchronizing all strikeout servers 16A-N. In addition, if a message is tagged as "repl5", this means that a replica is sending a strikeout request to LoM server 22. As such, all other strikeout servers should clear their strike lists as well.

III. Computerized Implementation

Figure 5:
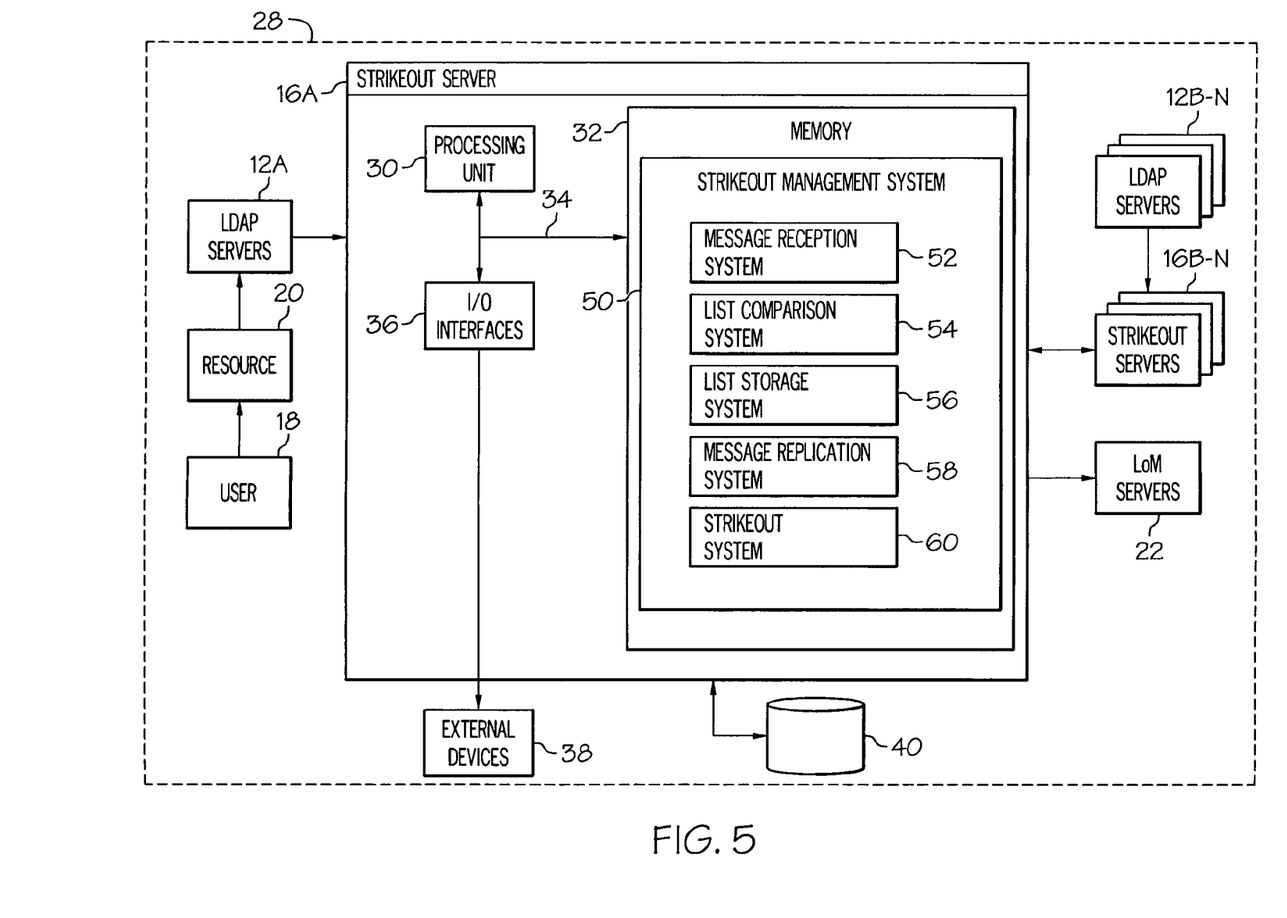
FIG. 5 depicts an illustrative system for managing log-in strikes according to the present invention.

Referring now to FIG. 5, a more detailed computerized implementation of the present invention is shown. In general, the present invention is typically implemented to manage log-in strikes over a geographically distributed computer infrastructure 28. As such, the present invention is typically implemented within a network environment (e.g., the Internet, a wide area network (WAN), a local area network (LAN), a virtual private network (VPN), etc.). Communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. It should be understood that one or more of the components of infrastructure 28 could be deployed, managed, serviced, etc., by a service provider who offers to provide its underlying functionality for customers.

As shown, FIG. 5 depicts LDAP servers 12A and 12B-N, strikeout servers 16A and 16B-N, and LoM server 22. As further shown, strikeout server 16A includes a processing unit 30, a memory 32, a bus 34, and input/output (I/O) interfaces 36. Further, strikeout server 16A is shown in communication with external I/O devices/resources 38 and storage system 40. In general, processing unit 30 executes computer program code, such as strikeout management system 50, which is stored in memory 32 and/or storage system 40. While executing computer program code, processing unit 30 can read and/or write data to/from memory 32, storage system 40, and/or I/O interfaces 36. Bus 34 provides a communication link between each of the components in strikeout server 16A. External devices 38 can comprise any devices (e.g., keyboard, pointing device, display, etc.) that enable a user to interact with strikeout server 16A and/or any devices (e.g., network card, modem, etc.) that enable strikeout server 16A to communicate with one or more other computing devices.

Strikeout server 16A is only representative of various possible computer systems that can include numerous combinations of hardware and/or software. To this extent, in other embodiments, strikeout server 16A can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 30 may comprise a single processing unit, or be distributed across one or more processing units in one or more locations, e.g., on a client and server. Similarly, memory 32 and/or storage system 40 can comprise any combination of various types of data storage and/or transmission media that reside at one or more physical locations. Further, I/O interfaces 36 can comprise any system for exchanging information with one or more external devices 38. Still further, it is understood that one or more additional components (e.g., system software, math co-processing unit, etc.) not shown in FIG. 5 can be included in strikeout server 16A. However, if strikeout server 16A comprises a handheld device or the like, it is understood that one or more external devices 38 (e.g., a display) and/or storage system(s) 40 could be contained within strikeout server 16A, not externally as shown. It should also be understood that LDAP servers 12A and 12B-N, strikeout servers 16B-N, and LoM server 22 will likely include computerized components similar to strikeout server 16A.

Storage system 40 can be any type of system (e.g., a database) capable of providing storage for information under the present invention, such as strike messages, strikeout messages, etc. To this extent, storage system 40 could include one or more storage devices, such as a magnetic disk drive or an optical disk drive. In another embodiment, storage system 40 includes data distributed across, for example, a local area network (LAN), wide area network (WAN) or a storage area network (SAN) (not shown). Although not shown, additional components, such as cache memory, communication systems, system software, etc., may be incorporated into strikeout server 16A. In addition, it should be understood that LDAP servers 12A and 12B-N, strikeout servers 16B-N, and LoM server 22 will likely include computerized components similar to strikeout server 16A. Such components are not depicted in FIG. 5 for brevity purposes.

Shown in memory 32 of strikeout server 16A is strikeout management system 50, which is a software program that will provide the functions of the present invention, and which includes a message reception system 52, a list comparison system 54, a list storage system 56, a message replication system 58, and a strikeout system 60. These systems provide the functionality of the present invention as discussed above. Specifically, if user 18 inputs an incorrect password during an attempted log-in to resource 20, a strike message will be communicated from LDAP server 12A to strikeout server 16A (e.g., via an SO MQ not shown in FIG. 5) and received by message reception system 52. Thereafter, list comparison system 54 will compare the incorrect password to a strike list for the DN being input by user 18 as maintained on strikeout server 16A (e.g., in memory 32, storage system 40, etc.) to determine if the incorrect password was previously received in another strike message during a predetermined period of time.

Based on these findings, list storage system 56 will store the incorrect password in the list with a corresponding timestamp (along with any tags and/or pieces of the strike message). As indicated above, list storage system 56 will store the incorrect password with the corresponding timestamp in a new entry in the list if the password was not previously received during a predetermined period of time. Conversely, list storage system 56 will replace a previous timestamp for the incorrect password in the list with the corresponding timestamp if the incorrect password was previously received during the predetermined period of time.

Regardless, the strike message will be replicated to all other strikeout servers 16B-N by message replication system 58. In the event a strikeout is realized when a predetermined quantity if uniquely incorrect passwords is accumulated, strikeout system 60 will send a strikeout message to strikeout servers 16B-N and LoM server, a list clear message to strikeout servers 16B-N, and clear its own strike list for the DN input by user 18.

While shown and described herein as a method, system and program product for managing log-in strikes, it is understood that the invention further provides various alternative embodiments. For example, in one embodiment, the invention provides a computer-readable/useable medium that includes computer program code to enable a computer infrastructure perform the functions of the present invention. To this extent, the computer-readable/useable medium includes program code that implements each of the various process steps of the invention. It is understood that the terms computer-readable medium or computer useable medium can comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 32 (FIG. 5) and/or storage system 40 (FIG. 5) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to manage log-in strikes. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for managing log-in strikes. In this case, a computer infrastructure can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as strikeout server 16A (FIG. 5), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A computer-implemented method for managing log-in strikes, comprising:
    receiving a strike message on a strikeout server from an authentication server pursuant to an incorrect password input during an attempted log-in of a user;
    comparing the incorrect password to a list to determine if the incorrect password was previously received on the strikeout server during a predetermined period of time;
    storing the incorrect password in the list on the strikeout server with a corresponding timestamp; and
    replicating the strike message and the timestamp to at least one other strikeout server to be stored on the at least one other strikeout server, the at least one other strikeout server being a geographically remote server that provides the receiving, comparing and storing for a different authentication server in a geographically distributed computer environment.

2. The method of claim 1, further comprising storing the incorrect password and the timestamp in a list on each of the at least one other strikeout server.

3. The method of claim 1, wherein the strike message comprises a distinguished name, an IP address and the incorrect password.

4. The method of claim 3, wherein the IP address is an IP address corresponding to a computer location of the attempted log-in.

5. The method of claim 1, wherein the storing step comprises:
    creating a new entry in the list if the incorrect password was not previously received on the strikeout server; and
    storing the incorrect password with the timestamp in the new entry.

6. The method of claim 1, wherein if the incorrect password was previously received on the strikeout server, the storing step comprises replacing a previous timestamp corresponding to the incorrect password as previously received with the corresponding timestamp received with the strike message.

7. The method of claim 1, wherein the strikeout strike message is received on the strikeout server from a LDAP server.

8. The method of claim 1, wherein the strikeout server is a master strikeout server in a group of strikeout servers that includes the at least one other strikeout server, and wherein the method further comprises receiving a strikeout message on the master strikeout server when a predetermined quantity of uniquely incorrect passwords are accumulated for the user during a predetermined period of time.

9. The method of claim 8, wherein the master strikeout server clears the list after receiving the strikeout message, and wherein the strikeout message is replicated to the group of strikeout servers.

10. A system for managing log-in strikes, comprising:
    a message reception system for receiving a strike message on a strikeout server from an authentication server pursuant to an incorrect password input during an attempted log-in of a user;
    a list comparison system for comparing the incorrect password to a list maintained on the strikeout server to determine if the incorrect password was previously received in another strike message during a predetermined period of time;
    a list storage system for storing the incorrect password in the list with a corresponding timestamp; and
    a message replication system for replicating the strike message and the corresponding timestamp to at least one other strikeout server to be stored on the at least one other strikeout server, the at least one other strikeout server being a geographically remote server that provides the receiving, comparing and storing for a different authentication server in a geographically distributed computer environment.

11. The system of claim 10, wherein the list storage system will store the incorrect password with the corresponding timestamp in a new entry in the list if the incorrect password was not previously received during the predetermined period of time, and wherein the list storage system will replace a previous timestamp for the incorrect password in the list with the corresponding timestamp if the incorrect password was previously received during the predetermined period of time.

12. The system of claim 10, wherein the strike message comprises a distinguished name, an IP address and the incorrect password.

13. The system of claim 12, wherein the IP address is an IP address corresponding to a computer location of the failed log-in attempt.

14. The system of claim 10, wherein the strikeout strike message is received on the strikeout server from a LDAP server.

15. The system of claim 10, wherein the strikeout server is a master strikeout server in a group of strikeout servers that includes the at least one other strikeout server, wherein the master strikeout server clears the list after receiving a strikeout message, and wherein the strikeout message is replicated to the group of strikeout servers.

16. A program product stored on a non-transitory computer readable storage medium for managing log-in strikes, the program product comprising program code for causing a computer system to perform the following steps:
- receiving a strike message on a strikeout server from an authentication server pursuant to an incorrect password input during an attempted log-in of a user;
- comparing the incorrect password to a list maintained on the strikeout server to determine if the incorrect password was previously received in another strike message during a predetermined period of time;
- storing the incorrect password in the list with a corresponding timestamp; and
- replicating the strike message and the corresponding timestamp to at least one other strikeout server to be stored on the at least one other strikeout server, the at least one other strikeout server being a geographically remote server that provides the receiving, comparing and storing for a different authentication server in a geographically distributed computer environment.

17. The program product of claim 16, wherein the storing step comprises storing the incorrect password with the corresponding timestamp in a new entry in the list if the incorrect password was not previously received during the predetermined period of time, and wherein the storing step comprises replacing a previous timestamp for the incorrect password in the list with the corresponding timestamp if the incorrect password was previously received during the predetermined period of time.

18. The program product of claim 16, wherein the strike message comprises a distinguished name, an IP address and the incorrect password.

19. The program product of claim 18, wherein the IP address is an IP address corresponding to a computer location of the failed log-in attempt.

20. The program product of claim 16, wherein the strike message is received on the strikeout server from a LDAP server.

21. The program product of claim 16, wherein the strikeout server is a master strikeout server in a group of strikeout servers that includes the at least one other strike-out server, wherein the master strikeout server clears the list after receiving a strikeout message, and wherein the strikeout message is replicated to the group of strikeout servers.

22. A method for deploying an application for managing log-in strikes, comprising:
- providing a computer infrastructure being operable to:
  - receive a strike message on a strikeout server from an authentication server pursuant to an incorrect password input during an attempted log-in of a user;
  - compare the incorrect password to a list maintained on the strikeout server to determine if the incorrect password was previously received in another strike message during a predetermined period of time;
  - store the strike message in the list with a corresponding timestamp; and
  - replicate the strike message and the corresponding timestamp to at least one other strikeout server to be stored on the at least one other strikeout server, the at least one other strikeout server being a geographically remote server that provides the receiving, comparing and storing for a different authentication server in a geographically distributed computer environment.

* * * * *